(12) United States Patent
Hussain et al.

(10) Patent No.: US 8,981,733 B2
(45) Date of Patent: *Mar. 17, 2015

(54) SYSTEM AND METHOD OF CHARGING A BATTERY USING A SWITCHING REGULATOR

(71) Applicant: QUALCOMM Incorporated, San Diego, CA (US)

(72) Inventors: M Abid Hussain, Los Altos, CA (US); Kenneth C Adkins, Mason, OH (US); Georgios Konstantinos Paparrizos, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,354

(22) Filed: May 22, 2013

(65) Prior Publication Data

US 2013/0257358 A1   Oct. 3, 2013

Related U.S. Application Data

(60) Continuation of application No. 13/470,199, filed on May 11, 2012, now Pat. No. 8,471,533, which is a continuation of application No. 12/972,200, filed on Dec. 17, 2010, now Pat. No. 8,193,780, which is a division of application No. 11/356,561, filed on Feb. 16, 2006, now Pat. No. 7,880,445.

(51) Int. Cl.
*H02J 7/06* (2006.01)
*H02J 7/24* (2006.01)
*H02J 7/00* (2006.01)

(52) U.S. Cl.
CPC ............... *H02J 7/007* (2013.01); *H02J 7/0073* (2013.01); *Y02B 40/90* (2013.01); *Y02E 70/40* (2013.01)

USPC .......................................... 320/164; 320/162

(58) Field of Classification Search
USPC .......................... 320/158–159, 140, 161–164
See application file for complete search history.

(56) References Cited

U.S. PATENT DOCUMENTS

| 5,534,765 A | 7/1996 | Kreisinger et al. |
| 5,554,921 A | 9/1996 | Li et al. |

(Continued)

FOREIGN PATENT DOCUMENTS

| CN | 1071950 C | 9/2001 |
| EP | 0903831 A2 | 3/1999 |

(Continued)

OTHER PUBLICATIONS

European Search Report—EP06025818—Search Authority—Munich—Mar. 30, 2012.

(Continued)

*Primary Examiner* — Samuel Berhanu
(74) *Attorney, Agent, or Firm* — Fountainhead Law Group P.C.

(57) ABSTRACT

In one embodiment the present invention includes a system and method of charging a battery using a switching regulator. In one embodiment, a switching regulator receives an input voltage and input current. The output of the switching regulator is coupled to a battery to be charged. The switching regulator provides a current into the battery that is larger than the current into the switching regulator. As the voltage on the battery increases, the current provided by the switching regulator is reduced. The present invention may be implemented using either analog or digital techniques for reducing the current into the battery as the battery voltage increases.

26 Claims, 10 Drawing Sheets

(56) References Cited

U.S. PATENT DOCUMENTS

| | | | |
|---|---|---|---|
| 5,696,436 A | 12/1997 | Kim et al. | |
| 5,831,412 A | 11/1998 | Morioka et al. | |
| 5,986,437 A | 11/1999 | Lee | |
| 6,075,478 A | 6/2000 | Abe | |
| 6,087,810 A | 7/2000 | Yoshida | |
| 6,144,187 A | 11/2000 | Bryson | |
| 6,184,660 B1* | 2/2001 | Hatular | 320/141 |
| 6,185,127 B1 | 2/2001 | Myers et al. | |
| 6,211,651 B1* | 4/2001 | Nemoto | 320/133 |
| 6,275,006 B1* | 8/2001 | Koike et al. | 320/125 |
| 6,297,617 B1 | 10/2001 | Aoyama | |
| 6,351,110 B1 | 2/2002 | Pappalardo et al. | |
| 6,353,305 B1 | 3/2002 | Cannon et al. | |
| 6,366,056 B1 | 4/2002 | Podrazhansky et al. | |
| 6,369,561 B1 | 4/2002 | Pappalardo et al. | |
| 6,400,124 B1 | 6/2002 | Hidaka et al. | |
| 6,404,169 B1 | 6/2002 | Wang | |
| 6,420,853 B1 | 7/2002 | Harada et al. | |
| 6,433,510 B1 | 8/2002 | Ribellino et al. | |
| 6,433,517 B2 | 8/2002 | Sakakibara | |
| 6,437,549 B1 | 8/2002 | Takagishi | |
| 6,456,035 B1 | 9/2002 | Crisp et al. | |
| 6,459,237 B1 | 10/2002 | Bausch | |
| 6,476,584 B2 | 11/2002 | Sakakibara | |
| 6,498,461 B1 | 12/2002 | Bucur | |
| 6,507,172 B2 | 1/2003 | Sherman | |
| 6,518,726 B1 | 2/2003 | Nowlin, Jr. et al. | |
| 6,580,249 B2 | 6/2003 | Yau et al. | |
| 6,586,917 B1 | 7/2003 | Smith | |
| 6,605,926 B2 | 8/2003 | Crisp et al. | |
| 6,611,129 B2 | 8/2003 | Bucur | |
| 6,617,827 B2 | 9/2003 | Knish et al. | |
| 6,617,927 B2 | 9/2003 | Numanami et al. | |
| 6,630,812 B1 | 10/2003 | Davis | |
| 6,664,764 B1 | 12/2003 | Odaohhara | |
| 6,664,765 B2 | 12/2003 | Dotzler et al. | |
| 6,693,577 B2 | 2/2004 | Yamamoto | |
| 6,791,297 B2 | 9/2004 | Ott et al. | |
| 6,791,300 B2 | 9/2004 | Trinh et al. | |
| 6,791,879 B1 | 9/2004 | Adkins | |
| 6,794,851 B2 | 9/2004 | Murakami et al. | |
| 6,803,745 B2 | 10/2004 | Nishida et al. | |
| 6,822,423 B2 | 11/2004 | Yau et al. | |
| 6,833,685 B2 | 12/2004 | Howard et al. | |
| 6,844,705 B2 | 1/2005 | Lai et al. | |
| 6,859,016 B2 | 2/2005 | Dotzler | |
| 6,917,184 B2 | 7/2005 | Lai et al. | |
| 6,919,709 B2 | 7/2005 | Rouverand et al. | |
| 7,002,266 B1 | 2/2006 | Adkins et al. | |
| 7,633,269 B2 | 12/2009 | Chou et al. | |
| 7,834,591 B2 | 11/2010 | Hussain et al. | |
| 7,880,445 B2 | 2/2011 | Hussain et al. | |
| 8,193,780 B2 | 6/2012 | Hussain et al. | |
| 2003/0030412 A1 | 2/2003 | Matsuda et al. | |
| 2003/0111980 A1 | 6/2003 | Lee | |
| 2003/0141850 A1 | 7/2003 | Dotzler et al. | |
| 2004/0164708 A1 | 8/2004 | Veselic et al. | |
| 2004/0189251 A1 | 9/2004 | Kutkut et al. | |
| 2005/0001595 A1 | 1/2005 | May et al. | |
| 2005/0083016 A1 | 4/2005 | Yau et al. | |
| 2005/0134220 A1* | 6/2005 | Brohlin et al. | 320/128 |
| 2005/0140333 A1 | 6/2005 | Chou et al. | |
| 2005/0189909 A1 | 9/2005 | Guthrie et al. | |
| 2005/0253560 A1 | 11/2005 | Popescu-Stanesti et al. | |
| 2005/0275377 A1 | 12/2005 | Chen | |
| 2005/0275381 A1 | 12/2005 | Guang et al. | |
| 2006/0006850 A1 | 1/2006 | Inoue et al. | |
| 2006/0119316 A1 | 6/2006 | Sasaki et al. | |
| 2006/0139002 A1 | 6/2006 | Zemke et al. | |
| 2006/0187689 A1 | 8/2006 | Hartular | |
| 2006/0255767 A1 | 11/2006 | Wong et al. | |
| 2007/0090797 A1 | 4/2007 | Glosser, Jr. et al. | |
| 2011/0025277 A1 | 2/2011 | Hussain et al. | |
| 2012/0223682 A1 | 9/2012 | Hussain et al. | |

FOREIGN PATENT DOCUMENTS

| | | |
|---|---|---|
| EP | 0961382 A2 | 12/1999 |
| EP | 1416605 A1 | 5/2004 |
| JP | 5095638 A | 4/1993 |
| JP | 5300667 A | 11/1993 |
| JP | H10225006 A | 8/1998 |
| JP | 2000092734 A | 3/2000 |
| JP | 2002216987 A | 8/2002 |
| JP | 2005012889 A | 1/2005 |
| JP | 2005086871 A | 3/2005 |
| TW | 178897 | 2/1992 |
| TW | 354205 | 3/1999 |
| TW | 443660 U | 6/2001 |
| TW | M253061 U | 12/2004 |
| TW | M256024 U | 1/2005 |
| WO | 2005050813 A1 | 6/2005 |

OTHER PUBLICATIONS

Extended European Search Report—EP06025816—Search Authority—The Hague—Jul. 4, 2012.

Intersil, "ISL6293 Li-ion/Li Polymer Battery Charger Accepting Two Power Sources", data sheet, Jan. 4, 2006.

Linear Technology, "LTC 4055 USB Power Controller and Li-Ion Linear Charger", data sheet, 2004.

Linear Technology, "LTC4002 Standalone Li-Ion Switch Mode Battery Charger", data sheet, 2003.

Linear Technology, "LTC4057-4.2 Linear Li-Ion Battery Charger with Thermal Regulation in ThinSOT", data sheet, 2003.

Maxim, "SOT23 Dual-Input USB/AC Adapter I-Cell Li+ Battery Chargers", data sheet, Jul. 2003.

Microchip Technology Inc., "PS2070 PS200 Switch Mode Charger Evaluation Board", data sheet, 2005.

National Semiconductor, "LP3947 USBI AC Adaptor, Single Cell Li-Ion Battery Charger IC", data sheet, Nov. 2004.

Texas Instruments, "Single-Chip, Li-Ion and Li-Pol Charger IC with Autonomous USB-Port and AC-Adapter Supply Management (bqTINY-II)", data sheet, Aug. 2004.

Texas Instruments, "Synchronous Switchmode, Li-Ion and Li-Pol Charge Management IC with Integrated Powerfets (bqSWITCHER)", data sheet, Nov. 2004.

Song J, "Lithium ion battery intelligent charger based on HT46R23," Power Source Technology, No. 8 2003, pp. 67-69.

* cited by examiner

SYSTEM AND METHOD OF CHARGING A BATTERY USING A SWITCHING REGULATOR

CROSS REFERENCE TO RELATED APPLICATIONS

This application is a continuation of and claims the benefit of U.S. patent application Ser. No. 13/470,199 filed on May 11, 2012, entitled "System and Method of Charging a Battery Using a Switching Regulator," which is a continuation of and claims the benefit of U.S. patent application Ser. No. 12/972,200, filed on Dec. 17, 2010, entitled "System and Method of Charging a Battery Using a Switching Regulator," which is a divisional of and claims the benefit of U.S. patent application Ser. No. 11/356,561, filed Feb. 16, 2006, entitled "System and Method of Charging a Battery Using a Switching Regulator," each of which is hereby incorporated by reference in their entirety for all purposes.

BACKGROUND

The present invention relates to switching battery chargers, and in particular, to switching battery charging systems and methods.

Batteries have long been used as a source of power for mobile electronic devices. Batteries provide energy in the form of electric currents and voltages that allow circuits to operate. However, the amount of energy stored in a battery is limited, and batteries loose power when the electronic devices are in use. When a battery's energy supply becomes depleted, the battery's voltage will start to fall from its rated voltage, and the electronic device relying on the battery for power will no longer operate properly. Such thresholds will be different for different types of electronic devices.

Many types of batteries are designed for a single use. Such batteries are discarded after the charge is depleted. However, some batteries are designed to be rechargeable. Rechargeable batteries typically require some form of battery charging system. Typical battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can be very inefficient or altogether ineffective. Inefficient use of the battery's charging specification can lead to very long charging times, for example. Additionally, if the charging process is not carried out efficiently, the battery's cell capacity (i.e., the amount of energy the battery can hold) may not be optimized. Moreover, inefficient charging can impact the battery's useful lifetime (i.e., number of charge/discharge cycles available from a particular battery). Furthermore, inefficient charging can result from the battery's characteristics changing over time. These problems are compounded by the fact that battery characteristics, including a battery's specified voltages and recharge currents, can be different from battery to battery.

Existing battery chargers are typically static systems. The charger is configured to receive power from a particular source and provide voltages and currents to a particular battery based on the battery's charge specification. However, the inflexibility of existing chargers results in many of the inefficiencies and problems described above. It would be advantageous to have battery charging systems and methods that were more flexible than existing systems or even adaptable to particular batteries or the changing battery charging environment. Thus, there is a need for improved battery charger systems and methods that improve the efficiency of the battery charging process. The present invention solves these and other problems by providing systems and methods of charging a battery using a switching regulator.

SUMMARY

In one embodiment, the present invention includes a method of charging a battery comprising receiving a first input voltage and a first input current at the input of a switching regulator, coupling an output of the switching regulator to a terminal of a battery, generating a first output voltage and a first output current at the terminal of the battery, wherein the switching regulator controls the first output current, and wherein the first output current to the battery is greater than the first input current and the first input voltage is greater than the first output voltage, and reducing the first output current as the first output voltage on the battery increases.

In one embodiment, the present invention further comprises sensing the first output voltage on the battery, and in accordance therewith, adjusting the first output current so that the first input current is below a first value.

In one embodiment, the present invention further comprises sensing the first input current to the switching regulator, and in accordance therewith, adjusting the first output current so that the first input current is below a first value.

In one embodiment, the present invention further comprises coupling a switching output current and a switching output voltage of the switching regulator through a filter to a terminal of a battery.

In one embodiment, the first output current is reduced across a plurality of current values as the first output voltage on the battery increases.

In one embodiment, the first output current is reduced continuously as the first output voltage on the battery increases.

In one embodiment, the first output current is reduced incrementally as the first output voltage on the battery increases.

In one embodiment, the first output current is reduced continuously to maintain a constant first input current to the switching regulator.

In one embodiment, the first output current is reduced incrementally if the first input current to the switching regulator increases above a threshold.

In one embodiment, the present invention further comprises sensing the first output voltage on the battery and changing a charge parameter in a programmable data storage element from a first value corresponding to a first constant output current to a second value corresponding to a second constant output current if the sensed first output voltage is greater than a first threshold, wherein the first constant output current is greater than the second constant output current.

In one embodiment, the present invention further comprises changing the charge parameter across a range of values corresponding to a plurality of successively decreasing constant output currents in response to increases in the sensed first output voltage.

In one embodiment, the present invention further comprises sensing the first input current to the switching regulator and changing a charge parameter in a programmable data storage element from a first value corresponding to a first constant output current to a second value corresponding to a second constant output current if the sensed first input current is greater than a first threshold, wherein the first constant output current is greater than the second constant output current.

In one embodiment, the present invention further comprises changing the charge parameter across a range of values corresponding to a plurality of successively decreasing constant output currents in response to the sensed first input current.

In one embodiment, the input of the switching regulator is coupled to a Universal Serial Bus port.

In one embodiment, the output of the switching regulator is coupled to a lithium ion battery, a nickel metal hydride battery, or a nickel cadmium battery.

In one embodiment, the first output current is reduced in accordance with a predefined software algorithm.

In another embodiment, the present invention includes a method of charging a battery, the method comprising receiving a first input voltage and a first input current at the input of a switching regulator, generating a first controlled output current from the switching regulator into the battery that is greater than the first input current to the switching regulator, sensing a voltage on the battery or the first input current to the switching regulator, and reducing the first controlled output current as the voltage on the battery increases.

In one embodiment, the switching regulator operates in a current control mode.

In one embodiment, the voltage on the battery is sensed and the first controlled output current is reduced continuously in response to sensing an increasing voltage on the battery.

In one embodiment, the voltage on the battery is sensed and the first controlled output current is incrementally set to lower values in response to sensing an increasing voltage on the battery.

In one embodiment, the first input current is sensed and the first controlled output current is reduced continuously to maintain a constant first input current to the switching regulator.

In one embodiment, the first input current is sensed and the first controlled output current is reduced incrementally if the first input current to the switching regulator increases above a threshold.

In one embodiment, the method further comprises changing a charge parameter in a programmable data storage element from a first value corresponding to a first constant output current to a second value corresponding to a second constant output current, wherein the first constant output current is greater than the second constant output current.

In one embodiment, the method further comprises changing a charge parameter in a programmable data storage element across a range of values corresponding to successively decreasing constant output currents in response to an increasing voltage on the battery.

In one embodiment, the method further comprises changing a charge parameter in a programmable data storage element from a first value corresponding to a first constant output current to a second value corresponding to a second constant output current that is less than the first output current if the first input current increases above a threshold.

In another embodiment, the present invention includes a battery charger comprising a switching regulator having a first input, a first output, and a control input, wherein the first input receives a first input voltage and a first input current, and the first output is coupled to a battery to provide a first output voltage and a first output current, an adjustable current controller having at least one input coupled to sense the first output current, at least one output coupled to a control input of the switching regulator, and a second input coupled to the first input of the switching regulator for detecting changes in the input current or to the battery for detecting changes in the first output voltage, wherein the second input changes the first output current to the battery in response to changes in the first input current or first output voltage, wherein the switching regulator provides a first output current to the battery that is greater than the first input current, and wherein the first output current is reduced as the voltage on the battery increases.

In one embodiment, the battery charger further comprises a sense resistor coupled between the first output of the switching regulator and the battery for sensing the first output current, wherein the at least one input of the adjustable current controller comprises a first input coupled to a first terminal of the sense resistor and a second input coupled to a second terminal of the sense resistor.

In one embodiment, the switching regulator operates in a current control mode.

In one embodiment, the first output current is adjusted so that the first input current remains below a first value.

In one embodiment, the battery charger further comprises a sense circuit that senses the first input current and the second input of the adjustable current controller is coupled to the sense circuit for detecting changes in the input current.

In one embodiment, the sense circuit comprises a first resistor coupled to the input of the switching regulator.

In one embodiment, the battery charger further comprises an analog or digital controller coupled between the sense circuit and the adjustable current controller, wherein the analog or digital controller changes a control voltage at the second input of the adjustable current controller if the first input current increases above a first threshold.

In one embodiment, the controller is a digital controller, and the digital controller changes digital bits in at least one programmable storage element if the first input current increases above a first threshold.

In one embodiment, the controller is an analog controller, and the analog controller has at least one input coupled to the sense circuit and at least one output coupled to the adjustable current controller, and where the analog controller changes a voltage at the second input of the adjustable current controller if the first input current increases above a first threshold.

In one embodiment, a second input of the adjustable current controller is coupled to the battery for detecting changes in the first output voltage.

In one embodiment, the battery charger further comprises a digital controller having at least one input coupled to the battery and an output coupled to the second input of the adjustable current controller, wherein the digital controller changes digital bits in at least one programmable data storage element if the first output voltage increases above a first threshold, and in accordance therewith, changes a voltage at the second input of the adjustable current controller for reducing the first output current.

In one embodiment, the battery charger further comprises an analog-to-digital converter coupled between the battery and the at least one input of the digital controller, and a digital-to-analog converter coupled between the programmable data storage element and the second input of the adjustable current controller.

In one embodiment, the programmable data storage element is a register.

In one embodiment, the programmable data storage element is a register and the digital controller changes digital bits in the register by loading digital bits into the register from a volatile memory.

In one embodiment, the programmable data storage element is a register and the digital controller changes digital bits in the register by loading digital bits into the register from a nonvolatile memory.

In one embodiment, the switching regulator further comprises a switching transistor, an error amplifier, and switching circuit, and at least one output of the adjustable current controller is coupled to a control terminal of the switching transistor through the error amplifier and switching circuit.

In one embodiment, the switching regulator comprises a pulse width modulation circuit.

In one embodiment, the adjustable current controller generates a first control signal to the switching regulator to produce a constant first output current into the battery, and the adjustable current controller changes the first control signal to continuously reduce the constant first output current as the voltage on the battery increases.

In one embodiment, the adjustable current controller generates a first control signal to the switching regulator to produce a constant first output current into the battery, and at least one data storage element coupled to the adjustable current controller is reprogrammed by a controller in response to an increase in the first input current or first output voltage, and in accordance therewith, the adjustable current controller changes the first control signal to incrementally reduce the constant first output current.

In one embodiment, the battery charger further comprises a register coupled to the second input of the adjustable current controller, wherein digital bits in the register are changed, in response to an increase in the first input current or first output voltage, from a first value to a second value, and in accordance therewith, the first output current is reduced.

In another embodiment, the present invention includes a method of charging a battery, the method comprising receiving a first voltage and a first current at a first terminal of a switching transistor, wherein the first voltage and first current are coupled to the first terminal of the switching transistor from a power source, receiving a switching signal at a control input of the switching transistor, and in accordance therewith, generating a second voltage and a second current at a second terminal of the switching transistor, filtering the second voltage and second current to produce a filtered voltage and filtered current, coupling the filtered voltage and filtered current to a terminal of a battery, wherein the filtered voltage at the terminal of the battery is less than the first voltage at the first terminal of the switching transistor, and wherein the filtered current into the terminal of the battery is greater than the first current into the first terminal of the switching transistor, and reducing the filtered current across a range of current values that are greater than a value of the first current as the voltage on the battery increases across a corresponding range of values that are less than the first voltage.

In one embodiment, filtering comprises coupling the second current to the battery terminal through at least one inductor.

In one embodiment, the filtered current is adjusted so that the first current remains below a first value.

In one embodiment, the method further comprises sensing the filtered current and the voltage on the battery, and in accordance therewith, controlling the filtered current.

In one embodiment, the method further comprises sensing the first current and the filtered current, and in accordance therewith, controlling the filtered current.

In one embodiment, the power source is a Universal Serial Bus port.

In another embodiment, the present invention includes a battery charger comprising a switching regulator including at least one switching transistor, the switching transistor having a first input to receive a first input voltage and a first input current, and a first output coupled to a battery to provide a first output voltage and a first output current, a current controller for controlling the first output current to the battery, the current controller having at least one input for sensing the first output current to the battery, a second input for adjusting the first output current in response to a control signal, and a first output coupled to the switching regulator, and a controller having a first input coupled to the first input of the switching regulator or the battery, and at least one output coupled to the second input of the current controller, wherein the controller is responsive to increases in the first input current or first output voltage, and wherein the controller changes the control signal at the second input of the current controller to reduce the first output current if the first input current or first output voltage increase, wherein the switching regulator provides a first output current to the battery that is greater than the first input current, and wherein the first output current is reduced as the first output voltage on the battery increases.

In one embodiment, the battery charger further comprises an output sense resistor coupled to the first output of the switching transistor for sensing the first output current, and the current controller is coupled to first and second terminals of the output sense resistor for controlling the first output current.

In one embodiment, the battery charger further comprises an input sense resistor coupled to the first input of the switching transistor for sensing the first input current and the controller is coupled to first and second terminals of the input sense resistor.

In one embodiment, the controller comprises an analog controller and the analog controller generates a control voltage at the second input of the current controller for reducing the first output current in response to the first input current.

In one embodiment, the controller comprises a digital controller, the circuit further comprising an analog-to-digital converter having inputs coupled across the input sense resistor and an output coupled to the digital controller, a register coupled to the digital controller, and a digital-to-analog converter having an input coupled to the register and an output coupled to the second input of the current controller, wherein the digital controller reprograms the register in response to an increase in the first input current, and in accordance therewith, the first output current is reduced.

In one embodiment, the battery charger further comprises a nonvolatile memory and the digital controller reprograms the register with parameters stored in the nonvolatile memory.

In one embodiment, the battery charger further comprises a volatile memory and the digital controller reprograms the register with parameters stored in the volatile memory.

In one embodiment, the first input of the controller is coupled to the battery.

In one embodiment, the controller comprises an analog controller, wherein the analog controller generates a control voltage at the second input of the current controller for reducing the first output current in response to the first output voltage.

In one embodiment, the controller comprises a digital controller, the circuit further comprising an analog-to-digital converter having an input coupled to the battery and an output coupled to the digital controller, a register coupled to the digital controller, and a digital-to-analog converter having an input coupled to the register and an output coupled to the second input of the current controller, wherein the digital controller reprograms the register in response to an increase in the first output voltage, and in accordance therewith, the first output current is reduced.

In one embodiment, the battery charger further comprises a nonvolatile memory and the digital controller reprograms the register with parameters stored in the nonvolatile memory.

In one embodiment, the battery charger further comprises a volatile memory and the digital controller reprograms the register with parameters stored in the volatile memory.

In one embodiment, the controller and current controller are on the same integrated circuit.

In one embodiment, the controller and current controller are on different integrated circuits.

In another embodiment, the present invention includes a battery charger comprising a switching regulator including at least one switching transistor, the switching transistor having a first input to receive a first input voltage and a first input current, and a first output coupled to a battery to provide a first output voltage and a first output current, current controller means, coupled to the switching regulator, for sensing and controlling the output current to the battery and for changing the first output current to the battery in response to a control signal, and controller means for generating the control signal to the current controller means in response to the first input current or first output voltage, wherein the switching regulator provides a first output current to the battery that is greater than the first input current, and wherein the first output current is adjusted as the voltage on the battery increases.

In one embodiment, the battery charger further comprises sense circuit means for sensing the first input current.

In one embodiment, the battery charger further comprises sense circuit means for sensing the first output current.

In one embodiment, the controller means comprises an analog circuit.

In one embodiment, the controller means comprises a digital circuit.

In one embodiment, the current controller means comprises first and second inputs for receiving voltages corresponding to the first output current, and a second input for receiving the control signal to reduce the first output current as the voltage on the battery increases.

In one embodiment, the battery charger further comprises voltage control means for controlling the first output voltage.

In one embodiment, the switching regulator further comprises switching circuit means for providing a switching signal to a control terminal of the switching transistor.

The following detailed description and accompanying drawings provide a better understanding of the nature and advantages of the present invention.

DETAILED DESCRIPTION

Described herein are techniques for switching battery charging systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
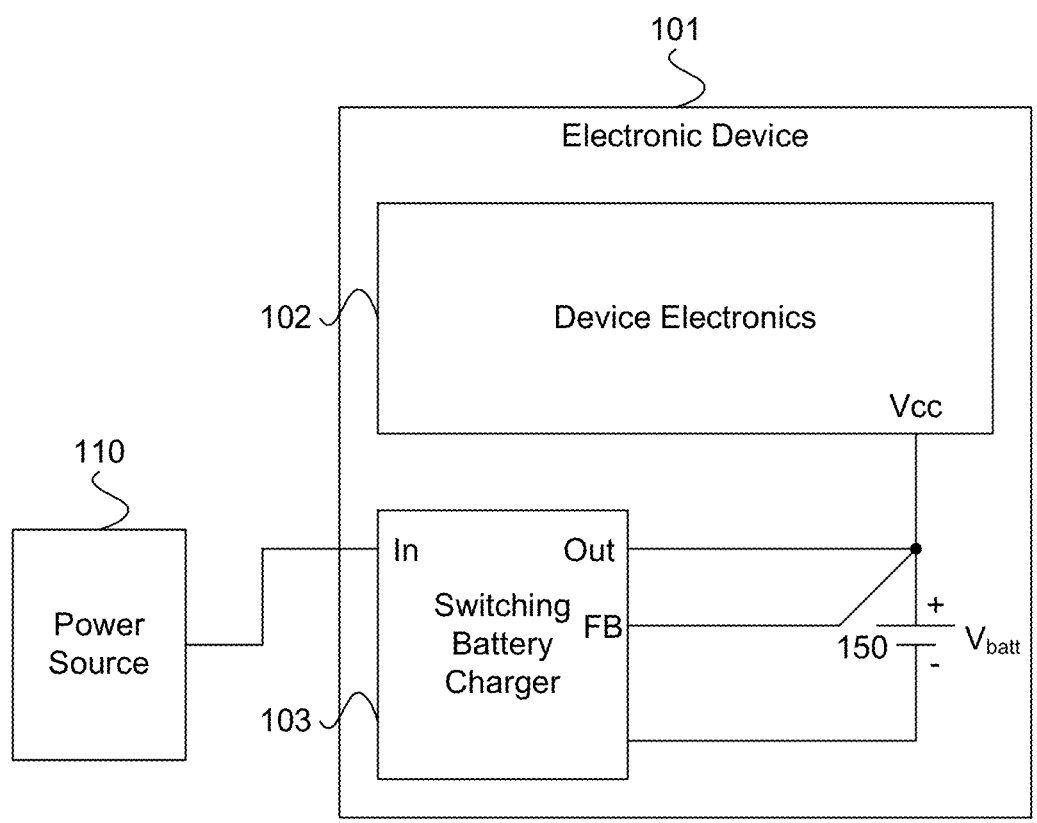
FIG. 1 illustrates an electronic device including a switching battery charger according to one embodiment of the present invention.

FIG. 1 illustrates a system 100 including electronic device 101 including a switching battery charger according to one embodiment of the present invention. An electronic device 101 includes device electronics 102 powered by a battery 150. The battery may be recharged using switching battery charger 103. Switching battery charger 103 has a first input coupled to a first power source 110 (e.g., an input voltage Vin from a power supply line of a Universal Serial Bus, "USB," port) and a first output to provide a regulated output to at least one battery through a filter as described in more detail below. The output voltages and currents provided to the filter will be switched waveforms. For the purposes of this description, the output of the switching regulator will be the output of the filter, which includes a filtered output current to the battery (i.e., a battery charge current) and a filtered output voltage at the battery terminal. Charger 103 may further include internal circuitry for sensing input currents, battery currents, and/or voltages, for example. Charger 103 may use such information for controlling the transfer of voltage and current from the power source 110 to the terminal of battery 150.

In one embodiment, switching battery charger 103 is operated in a current control mode to provide a controlled current to battery 150 during a first time period in a charging cycle. During a second time period in the charging cycle, charger 103 operates in a voltage control mode to provide a controlled voltage to battery 150. In a current control mode, the output current of the switching charger (i.e., the current into the battery) is used as the control parameter for the circuit (e.g., the current into the battery may be used to control a feedback loop that controls switching). Similarly, in a voltage control mode, the output voltage of the switching charger (i.e., the voltage on the battery) is used as the control parameter for the circuit (e.g., the voltage on the battery may be used to control a feedback loop that controls switching). For example, when the charger is in current control mode (e.g., when the battery voltage is below a certain threshold), the switching regulator may control the output current sourced into the battery. The system may then switch from current control mode to voltage control mode if a voltage on the battery increases above a specified threshold value. If the voltage on the battery rises to a particular level, the system may then control the voltage on the battery (e.g., by maintaining a constant battery voltage) as the uncontrolled current tapers off. In one embodiment, the current sourced to battery 150 by switching regulator 103 may be modified as the battery charges (e.g., as the battery voltage increases). In one specific example, the sourced current is changed by a digital controller that changes stored charging parameters stored in programmable data storage elements (e.g., a register or memory). In another specific example, the sourced current is changed by an analog controller that changes control signals at a control input of a current controller that controls the output current.

Embodiments of the invention may be used in a variety of electronic devices and for charging a variety of battery types and configurations. To illustrate the advantages of certain aspects of the present invention, an example will be described in the context of charging a lithium ion ("Li+") battery. However, it is to be understood that the following example is for illustrative purposes only, and that other types of batteries, such as lithium polymer batteries, nickel metal hydride batteries, or nickel cadmium batteries, for example, having different voltages and charge specifications could also be advantageously charged using the techniques described herein.

Figure 2:
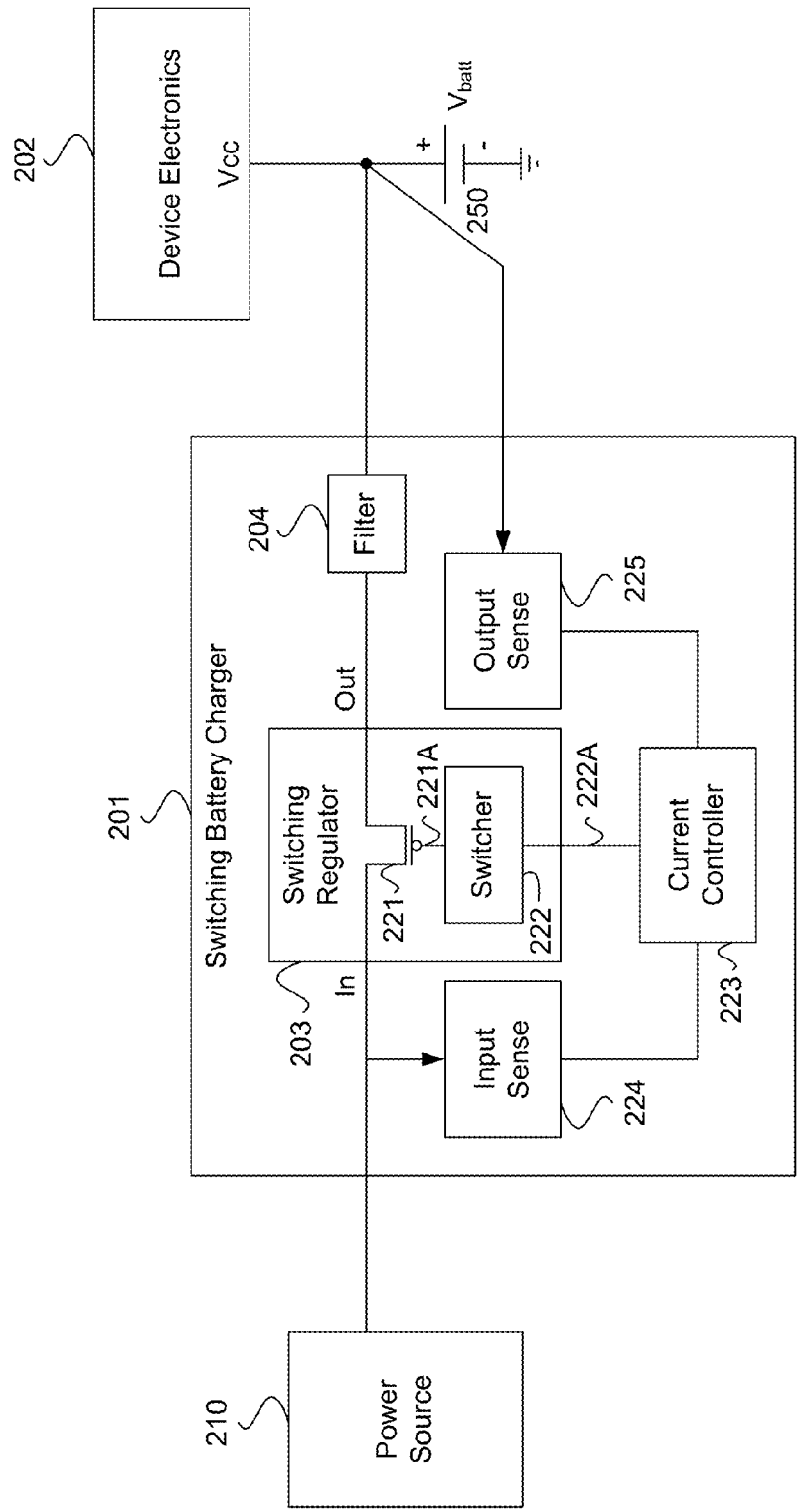
FIG. 2 illustrates a switching battery charger including a switching regulator according to one embodiment of the present invention.

FIG. 2 illustrates a switching battery charger 201 including a switching regulator 203 according to one embodiment of the present invention. Device electronics 202 includes a power supply terminal ("Vcc") that receives power from battery 250. When the battery 250 is depleted, it may be recharged by coupling voltage and current from a power source 210 to the battery 250 through a switching regulator 203 and filter 204. For example, the power source may be a DC power source. It is to be understood that the techniques described herein may also be applied to AC power sources. Thus, FIG. 2 is one example system using DC power. Switching regulator 203 may include a switching device 221, a switching circuit ("switcher") 222, an adjustable current controller 223, an output sense circuit 225, and an input sense circuit 224. Switching regulator 203 is distinguished from a linear regulator in that switching regulator 203 includes a switching circuit 222 that generates a switching control signal 222A at the control terminals of transistor 221. For example, the switching device 221 may be a PMOS transistor. However, it is to be understood that the switching device may be implemented using other types of devices such as one or more bipolar or MOS transistors, for example.

In current control mode, output sense circuit 225 senses the output current into the battery. Current controller 223 is coupled to output sense circuit 225 for controlling the output current. Current controller 223 receives inputs from output sense circuit corresponding to the output current. Current controller 223 uses these inputs to control switching circuit 222, which in turn provides signals to the control terminal of switching device 221 that modify the output current. An example switching control scheme may include pulse width modulating the control terminal of switching device 221. The output of switching regulator 203 is coupled through a filter 204 to a terminal of battery 250. Voltages or currents at the battery terminal may be controlled by sensing the battery voltage or current into the battery. In current control mode, current controller 223 may receive the sensed battery current and modify control signal 222A to change the behavior of switching circuit 222 and switching device 221 to maintain the battery current at a controlled value. Similarly, in voltage control mode, a voltage controller (described below) may receive the sensed battery voltage, and modify control signal 222A to change the behavior of switching circuit 222 and switching device 221 to maintain the battery voltage at a controlled value. Accordingly, the voltages or currents into the battery can be maintained at controlled values. As described in more detail below, current controller 223 may include another input coupled to either the voltage on the battery or the input current to the switching regulator to control modification of the battery current as the voltage on the battery increases. Since either battery voltage or input current may be used for this purpose, the system may or may not include an input sense circuit 224.

In one embodiment, switching regulator 203 receives a voltage and current from power source 210 and provides a charge current to the battery that is greater than the current received from the power source. For example, if the voltage received from the power source is greater than the battery voltage, then the switching regulator can provide a charge current into the battery that is greater than the input current to the switching regulator. When the voltage at the input of the switching regulator is greater than the voltage on the battery (sometimes referred to as a "Buck" configuration), the "ideal" voltage-current relationship of the switching regulator is given as follows:

$$V\text{out}=C*V\text{in; and}$$

$$I\text{out}=I\text{in}/C,$$

where C is a constant. For example, in a pulse width modulated switching regulator, C is the "Duty Cycle," D, of the switching waveform at the control input of the switching device(s). The above equations illustrate that the output current is a function of the input current, input voltage, and output voltage as follows:

$$I\text{out}=I\text{in}*(V\text{in}/V\text{out}).$$

It is to be understood that the above equations apply to an "ideal" buck regulator. In an actual implementation, the output is derated for non-idealities (i.e., efficiency losses), which may be around 10% (i.e., efficiency, $\eta$=90%). The above equations illustrate that the charge current into battery 250 may be larger than the input current (i.e., where the input voltage Vin is greater than the output voltage). Moreover, at the beginning of a charge cycle, the battery voltage is less than at a point in time later in the charge cycle. Thus, at the beginning of the charge cycle the current into the battery may be larger (i.e., when Vin/Vbatt is larger; where Vbatt=Vout) than the current into the battery at later points of time in the charge cycle (i.e., when Vin/Vbatt is smaller). In one embodiment, the current into the battery (i.e., the output current of the switching regulator) is controlled and set to an initial value, and as the battery voltage increases, the output current is reduced. The above equations illustrate that as the battery voltage increases, the current into the switching regulator will start to increase for a given current at the output of the switching regulator. This effect results from the voltage-current relationships on the switching regulator shown above. For example, if Iout and Vin are fixed, then Iin must increase as Vout increases. Accordingly, different embodiments may sense the output voltage or input current, and reduce the current into the battery as the battery voltage increases.

For example, switching regulator 203 may operate in a current control mode, wherein the output sense circuit 225 senses the output current of the switching regulator (i.e., the battery input current), and current controller 223 controls the reduction of current into the battery as the voltage on the battery increases. In one embodiment, current controller 223 may reduce the battery current in response control signals corresponding to an increasing battery voltage, which signal current controller 223 to reduce the battery current. In another embodiment, input sense circuit 224 senses the input current to the switching regulator, and current controller 223 reduces the current into the battery in response to control signals corresponding to an increasing input current. Equivalently, other parameters related to the input current or battery voltage could be monitored to obtain the desired information for adjusting the current into the battery. In one embodiment, a controller (described in more detail below) is used for generating one or more control signals to the current controller in response to the first input current or first output voltage. A controller is a circuit that receives the sensed parameter (e.g., input current or battery voltage as an analog or digital signal) and generates one or more control signals to current controller 223 to adjust the current at the output. Sense circuits, controllers and current controllers may be implemented as analog circuits (in whole or in part) so that the switching regulator output current (i.e., the battery charging current) is reduced continuously as the switching regulator output voltage on the battery increases. In another embodiment, the controllers and/or current controllers may be implemented as digital circuit (in whole or in part) so that the battery charging current is reduced incrementally as the battery voltage increases. Examples of these circuits are described below.

Figure 3:
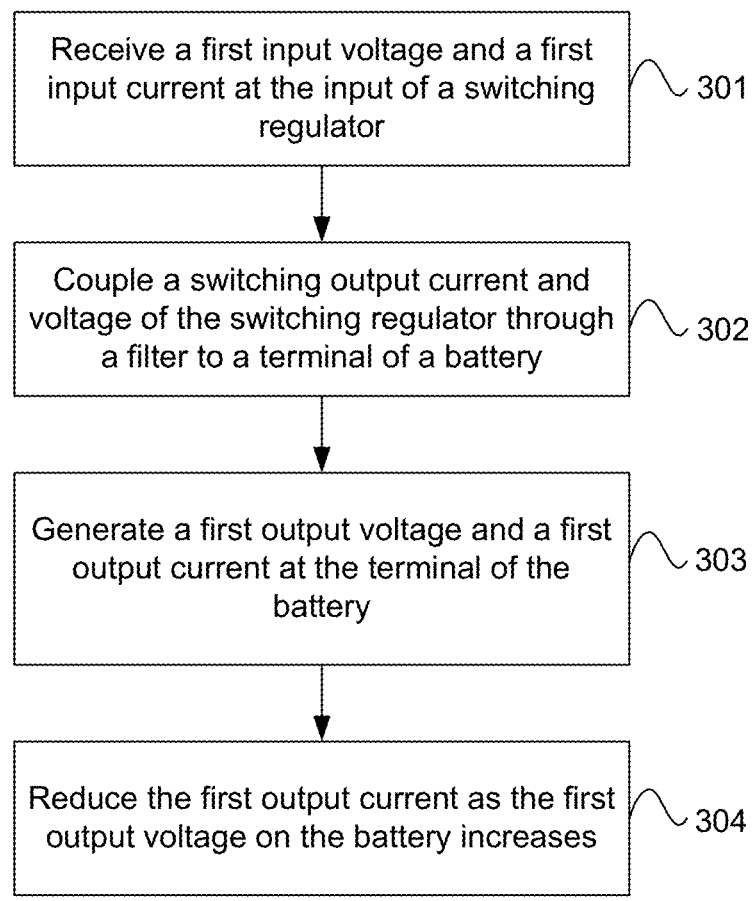
FIG. 3 illustrates charging a battery using a switching regulator according to one embodiment of the present invention.

FIG. 3 illustrates charging a battery using a switching regulator according to one embodiment of the present invention. At 301, an input voltage and an input current are received at the input of a switching regulator. At 302, a switching output current and voltage at the output of the switching regulator are coupled to the terminal of a battery. For example, an output terminal of a switching transistor may be coupled through a filter to the battery terminal. At 303, an output voltage (i.e., the battery voltage) and output current (i.e., battery input current) are generated at the output of the switching regulator. At 304, the current into the battery is reduced as the output voltage on the battery increases. As mentioned above, the switching regulator may detect the rise in the battery voltage by sensing either the battery voltage directly, the input current, or other related parameters.

Figure 4A:
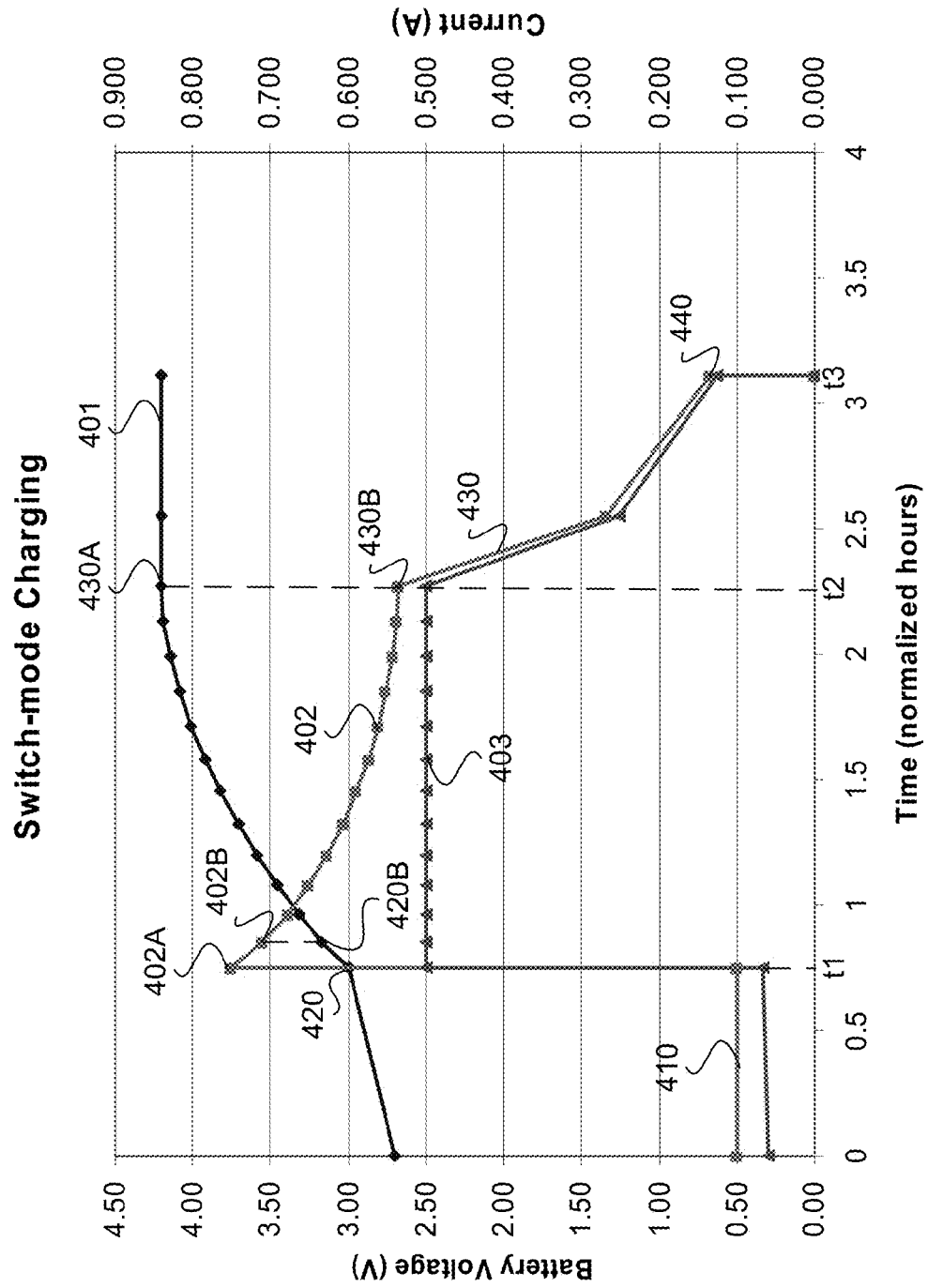
FIGS. 4A-B illustrate charging a battery using a switching regulator according to embodiments of the present invention.
Figure 4B:
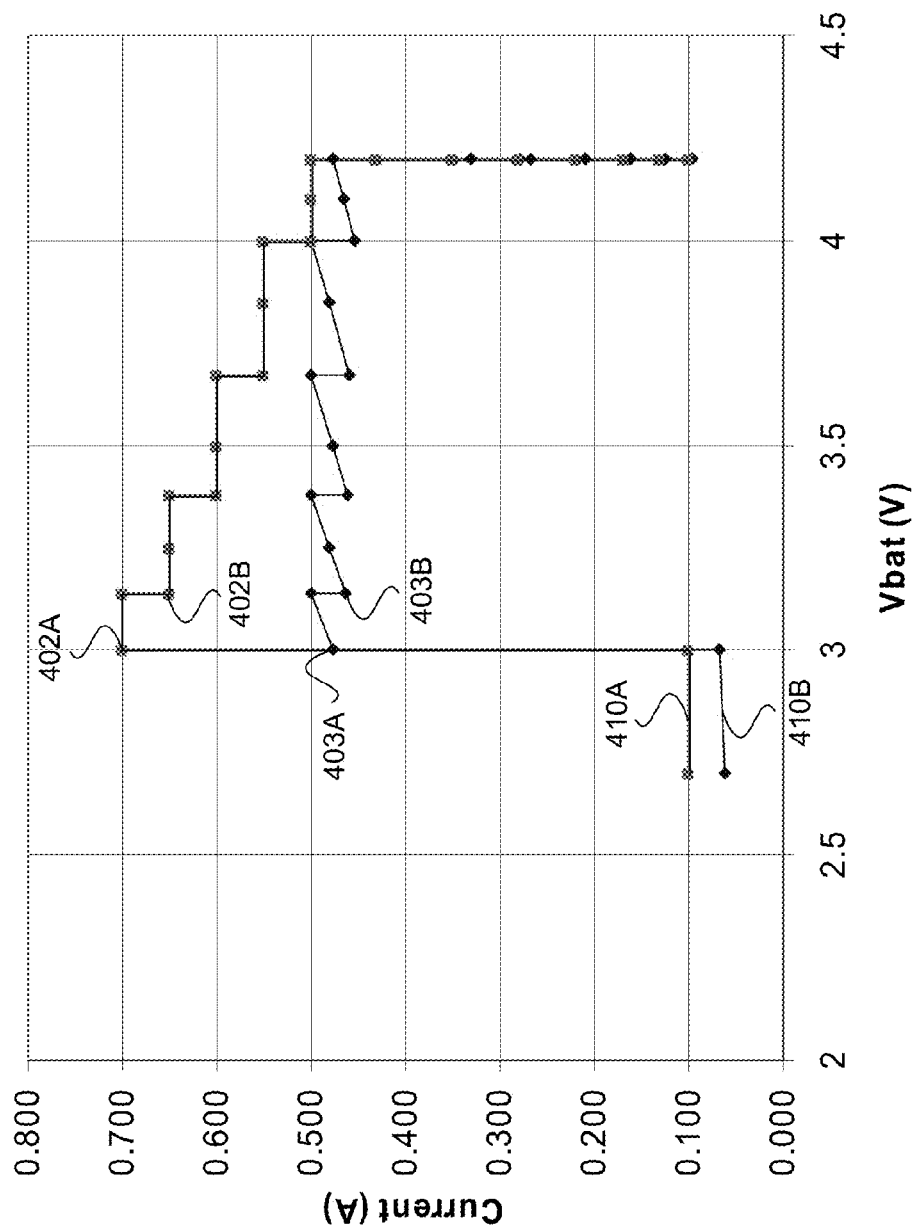

FIGS. 4A-B illustrate charging a battery using a switching regulator according to embodiments of the present invention. The graph in FIG. 4A shows the current plotted on the right vertical axis and the voltage on the battery on the left vertical axis versus time on the horizontal axis. Voltage on the battery over time is shown by the line 401, current into the battery is shown by the line 402, and current into the switching regulator is shown by the line 403. This example illustrates a charge cycle for charging a deeply depleted Li+ battery. The battery is charged in two basic modes: a current control mode (t=0, t2) and a voltage control mode (t=t2, t3). In this example, the voltage on the battery is initially below some particular threshold (e.g., 3 volts), indicating that the battery is deeply depleted. Accordingly, the current control mode may initially generate a constant precharge current 410 (e.g., 100 mA). The constant precharge current 410 will cause the battery voltage to start to increase. When the battery voltage increases above a precharge threshold 420 (e.g., 3 volts), the system will increase the current sourced to the battery. The second current is sometimes referred to as the "fast charge" current.

As shown in FIG. 4A, the current into the battery may be larger than the current received by the switching regulator. For example, at the beginning of the fast charge cycle, the current into the battery may be initially set at 750 mA, whereas the current into the switching regulator is 500 mA. Accordingly, the voltage on the battery will begin to increase as the battery is charged. As the battery voltage increases, the current into the battery may be reduced so that the input current remains approximately constant. As mentioned above, if the voltage on the battery increases, and if the current supplied by the switching regulator remains constant, the current into the switching regulator will begin to increase. In some applications it may be desirable to maintain the input current below some threshold values so that the total power into the switching regulator does not exceed the total power available at the power source. In this example, the input current is maintained approximately constant and the current into the battery is reduced as the battery voltage increases. For instance, when the battery voltage increases above 3 volts at 420B, the current into the battery is reduced to about 700 mA. From FIG. 4A it can be seen that the current is successively decreased as the voltage on the battery increases to maintain the input current approximately constant. As mentioned above, either analog or digital techniques may be used to control the battery current. Additionally, the system may sense either the input current to the switching regulator or battery voltage to implement battery current control.

When the voltage on the battery increases above a threshold 430A at time t2, the system may automatically transition to provide a constant voltage to the battery (i.e., the "float" voltage). When the battery increases to the float voltage during current control mode, the system will transition into voltage control mode and maintain the float voltage at the battery. While the system is in voltage control mode, the current 430 into the battery will begin to decrease (i.e., "taper" or "fall off"). In some embodiments, it may be desirable to turn off the charger after the current reaches some minimum threshold 440. Thus, when the battery current falls below a minimum value, the system may automatically shut down the charger and end the charge cycle at time t3.

FIG. 4B illustrates the input current to a switching regulator and the battery current provided by the switching regulator versus battery voltage. The graph in FIG. 4B shows the current plotted on the left vertical axis and battery voltage on the horizontal axis. Initially, the battery voltage is below some threshold (e.g., 3 volts), the system is in precharge mode, and the switching regulator is set to provide a constant precharge current 410A (e.g., 100 mA) to the battery. Accordingly, the input current 410B is less than battery current (e.g., <100 mA). When the system transitions into fast charge mode (e.g., as a result of the battery voltage increases above some threshold value, such as 3 volts), the battery current may be reset from a precharge value to a maximum value 402A (e.g., 700 mA). When the current supplied to the battery from the switching regulator is increased, the input current is similarly increased to a new value 403A (e.g., about 475 mA). However, as the battery voltage increases above the threshold, the input current will increase if the output current is held constant. In some applications, the power source, such as a USB power source, may not be able to supply input current to the switching regulator above some maximum value (e.g., 500 mA for USB). The maximum input value may be taken into consideration when setting the current into the battery. Accordingly, when the input current increases to some threshold value (e.g., a maximum allowable level such as 500 mA), the system may reset the battery current to a new value 402B less than the previous value so that the input current is accordingly reduced below the threshold at 403B (e.g., about 450 mA). The output current into the battery may be reduced incrementally as the output voltage on the battery increases so that the input current remains below a threshold as shown in FIG. 4B. In one embodiment, the output current is reduced incrementally in response to sensing the input current to the switching regulator, and determining that the input current has increased above a threshold. In another embodiment, the output current is reduced incrementally in response to sensing the battery voltage.

Figure 5:
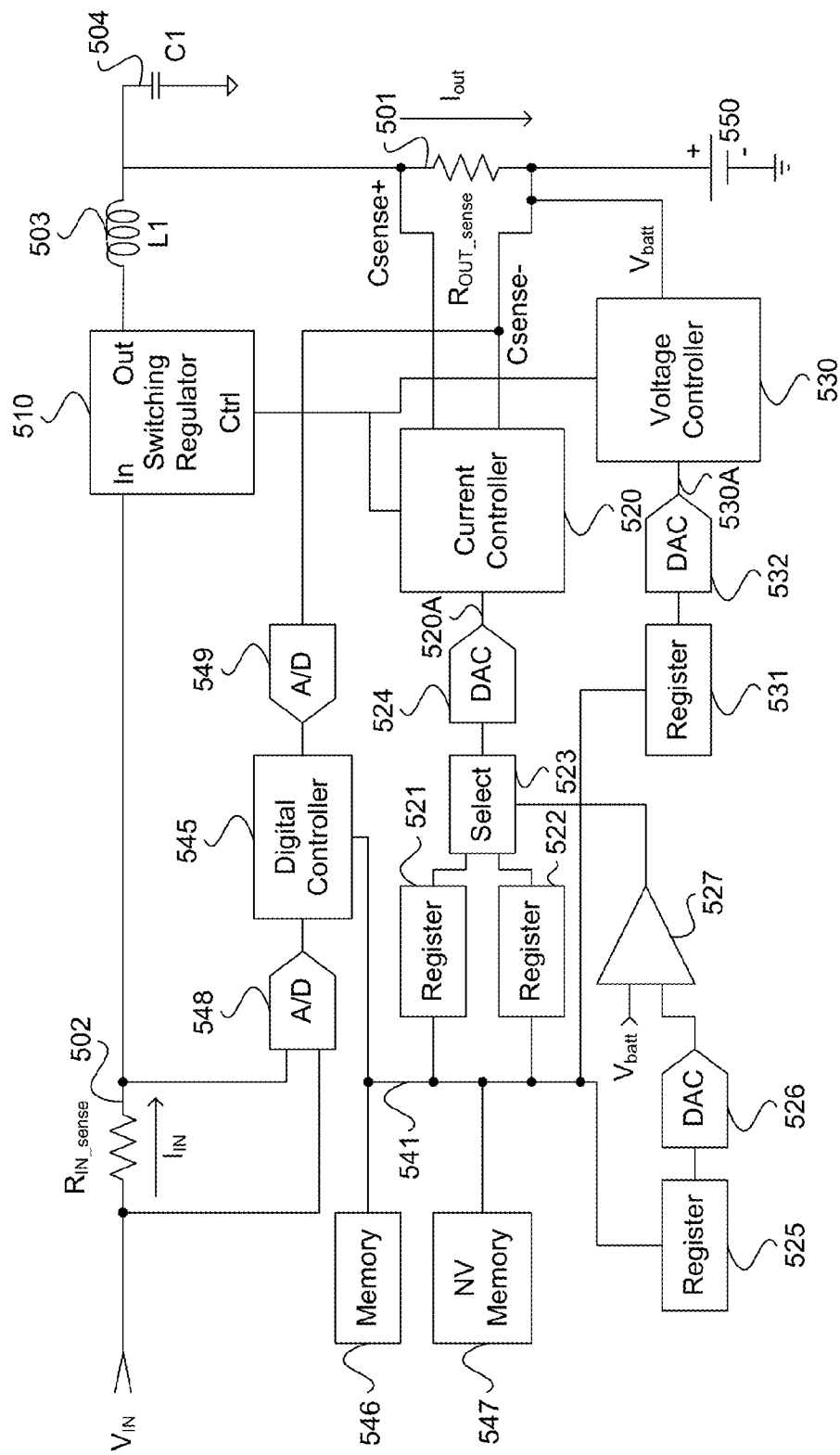
FIG. 5 illustrates an example implementation of a battery charging system according to one embodiment of the present invention.

FIG. 5 illustrates an example implementation of a battery charging system 500 according to one embodiment of the present invention. This example illustrates one possible implementation using a digital controller 545 and programmable storage for adjusting the battery current as the battery voltage increases. Battery charger 500 includes a switching regulator 510 having an input for receiving input voltage and current from a power source. The output of switching regulator 510 is coupled to battery 550 through a filter comprising an inductor 503 and capacitor 504. A current sense resistor 501 may also be included in the current path to the battery. A current controller 520 has a first input coupled to a first terminal of current sense resistor 501 and a second input coupled to a second terminal of current sense resistor 501 for sensing the battery current. In current control mode, current controller 520 receives the sensed battery current and provides a control signal to a control input of switching regulator 510. In this example, current controller 520 is an adjustable current controller, and includes a control input 520A that receives control signals for adjusting the output current generated by the switching regulator. System 500 further includes a voltage controller 530 for the voltage control mode of a charge cycle. Voltage controller 530 includes a first input coupled to the terminal of the battery for sensing battery voltage. In voltage control mode, the output of voltage controller 530 generates a control signal to switching regulator 510. In this example, voltage controller 530 is an adjustable voltage controller, and includes a control input 530A for adjusting the output current generated by the switching regulator.

Charging system 500 further includes data storage coupled to current controller 520 and voltage controller 530 for configuring the switching regulator in current control and voltage control modes. Programmable data storage elements, such as registers or memory, may store a plurality of charging parameters for controlling switching regulator 510 during the charging of battery 550. The parameters may be reprogrammed to change the voltages and/or currents or other parameters used to charge the battery, and thereby improve battery charging efficiency. Data storage may be either volatile or nonvolatile memory, for example, and the charging parameters may be reprogrammed across different charge cycles or during a single charge cycle (while the battery is charging).

In this example, a digital controller 545 is used to modify the control input of current controller 520 to change the battery current as the voltage on the battery increases. In one embodiment, a sense circuit (e.g., an input sense resistor 502) may be used to sense the switching regulator's input current. In this example, the input sense resistor 502 is the means for sensing the first input current received by the switching regulator. Equivalent sensing means may include transistor or inductive sense techniques, for example. The terminals of resistor 502 are coupled to digital controller 545 through an analog-to-digital ("A/D") converter 548. In another embodiment, the voltage on the battery may be coupled to digital controller 545 through A/D 549. Controller 545 receives the sensed input current or output voltage and adjusts current controller 520 to control the battery current as described above. For example, digital controller 545 may be used to program data storage elements with charging parameters, which, in turn, are converted to analog signals and coupled to the control input 520A of current controller 520. The charging parameters in data storage may be programmed through controller 545 using a digital bus 541 (e.g., a serial or parallel bus), for example. Accordingly, the charging parameters may be changed under control of a predefined software algorithm. Controller 545 may be included on the same integrated circuit as the switching regulator and switching battery charger circuitry, or controller 545 may be included on another integrated circuit in the electronic device. In one embodiment, the digital bus may be coupled to or implemented using an I²C bus or Universal Serial Bus ("USB"), for example.

In one embodiment, charging parameters may each be stored as a plurality digital bits, and different charging parameter may be programmed in register 522 from volatile memory 546 or nonvolatile memory 547, which may be local or remote (e.g., on the same integrated circuit or system or on another integrated circuit or system). The digital bits corresponding to a plurality of charging parameters may then be converted to an analog parameter, such as a voltage or current. The analog parameter may, in turn, be coupled to the control input of current controller 520, and in turn to the control input of switching regulator 510 to change the battery current. In one embodiment, the digital bits may be converted to an analog parameter using a digital-to-analog converter ("DAC") 524, for example. A variety of techniques may be used for A/Ds and DACs. In this example, the DAC 524, register 522, digital controller 545, and either A/D 548 or A/D 549 comprise the means for generating the control signal to the current controller in response to the first input current or first output voltage. It is to be understood that other sense and control circuit techniques may be used, and that the resistor sensing, A/Ds, registers, and DACs are just an example.

In one embodiment, a charge cycle includes precharging and fast charging current control modes, and a voltage control mode. For example, current to the battery may be programmed by parameters stored as digital values in registers 521 and 522. Register 521 may store a digital precharge parameter value, and register 522 may store one or more digital fast charge parameter values. Different fast charge parameter values may be selectively coupled to the current controller 520 to set the current supplied to the battery based on either a sensed battery voltage or a sensed battery current. In this example, register 525 may hold a digital value for setting the precharge threshold. The bits of register 525 may be inputs to a digital-to-analog converter ("DAC") 526, which may translate the bits into an analog parameter such as a voltage, for example. A voltage output of DAC 526 may be used as a reference and compared to the battery voltage in comparator 527. When the battery voltage is below the programmed precharge threshold, the comparator may couple the stored precharge current value in register 521 to DAC 524 using select circuit 523 (e.g., a multiplexer). DAC 524, in turn, receives the digital value corresponding to the precharge current and generates an analog parameter for controlling the regulator to deliver the programmed current value. When the battery voltage increases above the value programmed in register 525, the comparator changes state, and select circuit 523 couples the stored fast charge current value in register 522 to DAC 524. DAC 524, in turn, receives the new digital value corresponding to the fast charge current and generates an analog parameter for controlling the switching regulator to deliver the new programmed current value. It is to be understood that the above circuit is just one example implementation. In another example, the precharge threshold may be controlled by using the battery voltage to drive a voltage divider. Particular taps of the voltage divider may be digitally selected by a programmable register. A selected tap may then be coupled to a comparator and compared to a reference voltage, for example.

As the battery voltage increases, digital controller 545 may reprogram register 522 to change the battery current. For example, digital controller 545 may compare the battery voltage against a threshold (either in software or in hardware), and reprogram register 522 if the battery voltage is above the threshold. As the battery voltage increases, controller 545 may compare the battery voltage against different thresholds to change the output current. The thresholds may be linearly spaced apart, for example, or determined according to particular system requirements. Alternatively, digital controller 545 may compare the regulator input current against a threshold (either in software or in hardware), and reprogram register 522 if the input current is above the threshold.

For voltage control mode, voltage controller 530 is coupled to register 531 for storing the threshold for changing from current control to voltage control. Register 531 stores the threshold as a digital value. The digital bits of register 531 are input to DAC 532 and converted into an analog parameter for maintaining a constant programmed voltage on the battery. When the battery voltage increases above the voltage programmed in register 531, the system will transition into voltage control mode, and a constant programmed voltage will be maintained at the output of the regulator and the current gradually decreases.

Digital controller 545 may also be used to manipulate other digital information in the system. Controller may include circuits for reading and writing to memory or registers, for example, as well as other system control functions such as interfacing with other electronics over a serial or parallel bus. As mentioned above, the charging parameters may be stored in a nonvolatile memory 547 such as an EEPROM, for example, or a volatile memory 546. The nonvolatile or volatile memories may be on the same integrated circuit as the switching regulator or the memories may be external. If the memories are external, the system may further include an interface (not shown) for accessing external resources. In this example, the parameters are stored in nonvolatile memory 546 and transferred to registers 521, 522, 525, and 531.

Embodiments of the present invention further include reprogramming one or more charging parameters in accordance with a predefined software algorithm. Software for controlling the charging process may be written in advance and loaded on the electronic device to dynamically control the charging process. For example, an electronic device may include a processor, which may be a microprocessor or microcontroller, for example. The processor may access charge control software in volatile or nonvolatile memory and may execute algorithms for reprogramming the charging parameters. The algorithm may change one or more charging parameters while the battery is charging, for example, or the algorithm may change one or more charging parameters over multiple charging cycles. The algorithm may change the parameter values in either the registers (e.g., for dynamic programming) or in the nonvolatile memory (e.g., for static programming). For example, the algorithm may be received as inputs sensed battery conditions, and the algorithm may modify the programmed fast charge current based on such conditions. From the example shown in FIG. 5, it can be seen that including digital control in the system allow flexible programmability of a variety of parameters, including the current delivered to the battery during recharging or the thresholds compared against the battery voltage or input current to control changes in the output current. Such thresholds may be modified across multiple charge cycles or even during a single charge cycle.

Figure 6:
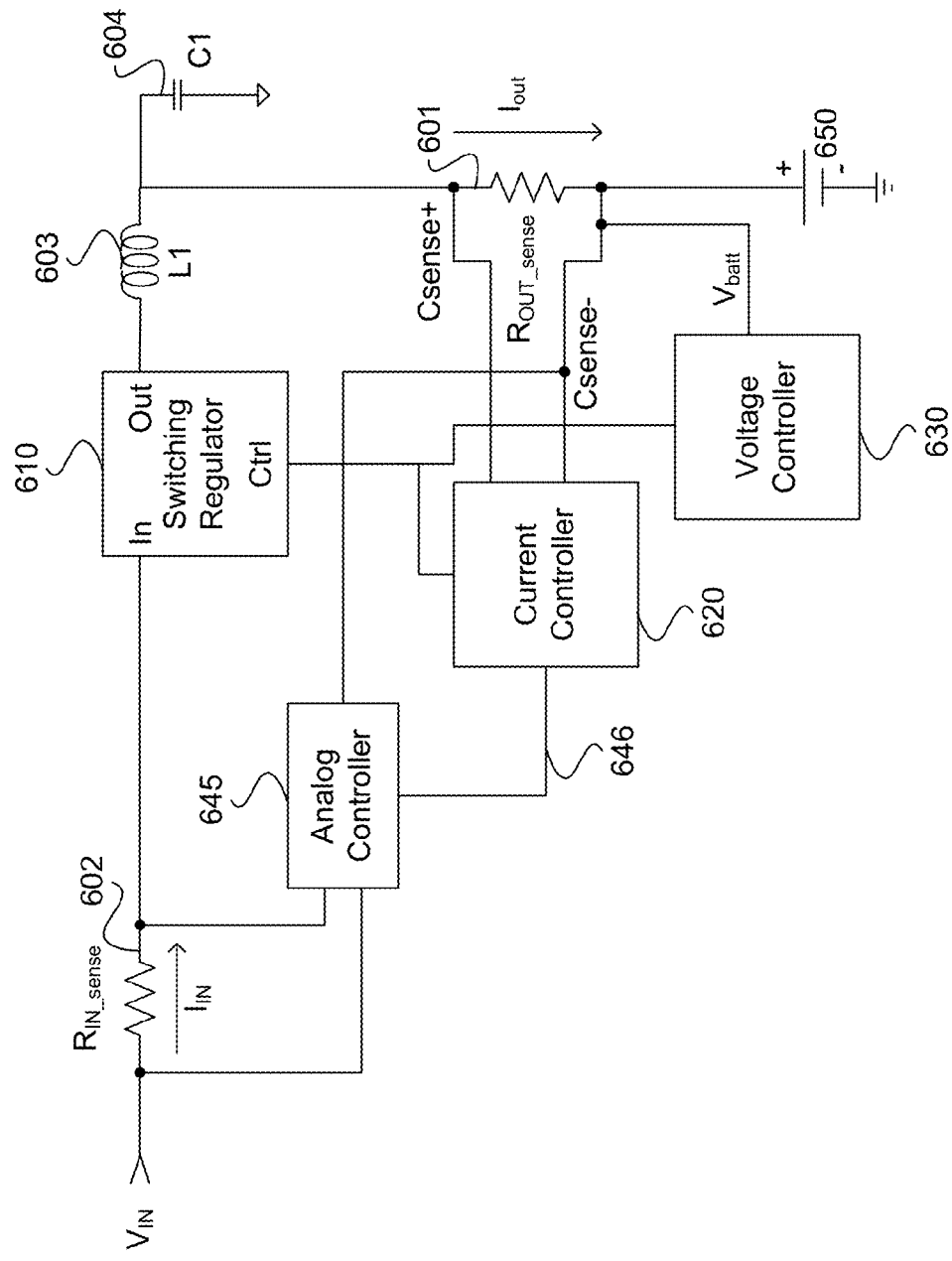
FIG. 6 illustrates an example implementation of a battery charging system according to one embodiment of the present invention.

FIG. 6 illustrates an example implementation of a battery charging system 600 according to one embodiment of the present invention. This example illustrates one possible implementation using analog controller 645 for adjusting the battery current as the battery voltage increases. Battery charger 600 includes a switching regulator 610 having an input for receiving voltage and current from a power source. The output of switching regulator 610 is coupled to battery 650 through a filter comprising an inductor 603 and capacitor 604. As described for battery charging system 500 in FIG. 5, in current control mode, current controller 620 senses the output current and provides a control signal to a control input of switching regulator 610 for controlling the current sourced to the battery. In this example, a current sense resistor 601 is included in the current path to the battery, and current controller 620 has a first input coupled to a first terminal of current sense resistor 601 and a second input coupled to a second terminal of current sense resistor 601 for sensing the battery current. As in charger 500 in FIG. 5, current controller 620 is an adjustable current controller, and includes a control input 646 that receives control signals for adjusting the output current generated by the switching regulator. System 600 further includes a voltage controller 630 for the voltage control mode of a charge cycle. Voltage controller 630 includes a first input coupled to the terminal of the battery for sensing battery voltage. In voltage control mode, the output of voltage controller 630 generates a control signal to switching regulator 610.

In this example, analog controller 645 provides the means for generating the control signal to the current controller in response to the first input current or first output voltage. Analog controller 645 may be coupled to either the battery terminal for sensing the battery voltage or to an input current sense circuit for sensing input current to the switching regulator. In this example, the input current sense circuit is a current sense resistor 602 coupled to the input of switching regulator 610. In this example, analog controller 645 may have an input coupled to the battery, or analog controller 645 may include two inputs coupled across sense resistor 601. In response to either the sense input current or battery voltage, analog controller modifies one or more control signals on the control input 646 of current controller 620 to change the battery current. Analog controller 645 may use a variety of different input or output circuit techniques to sense the input current or battery voltage and generate the proper signal or signals depending on the particular implementation of current controller 620. For example, analog controller 645 may include amplifiers, current sources, limiters, and/or comparison circuits, for example, for processing the sensed voltages or currents and generating one or more control signals on control input 646 to current controller 620 to adjust the battery current. It is to be understood that a variety of sensing circuits and analog circuits may be used. Thus, the battery current generated in current control mode may be adjusted by analog controller 645 in response to either the sensed battery voltage input or the sensed input current. Accordingly, current controller 620 may generate a current into the battery that is greater than the current into the switching regulator as described above. Current controller 620 may sense the input current to the battery and the control signal from analog controller 645, and the battery current may be reduced as the voltage on the battery increases.

Figure 7:
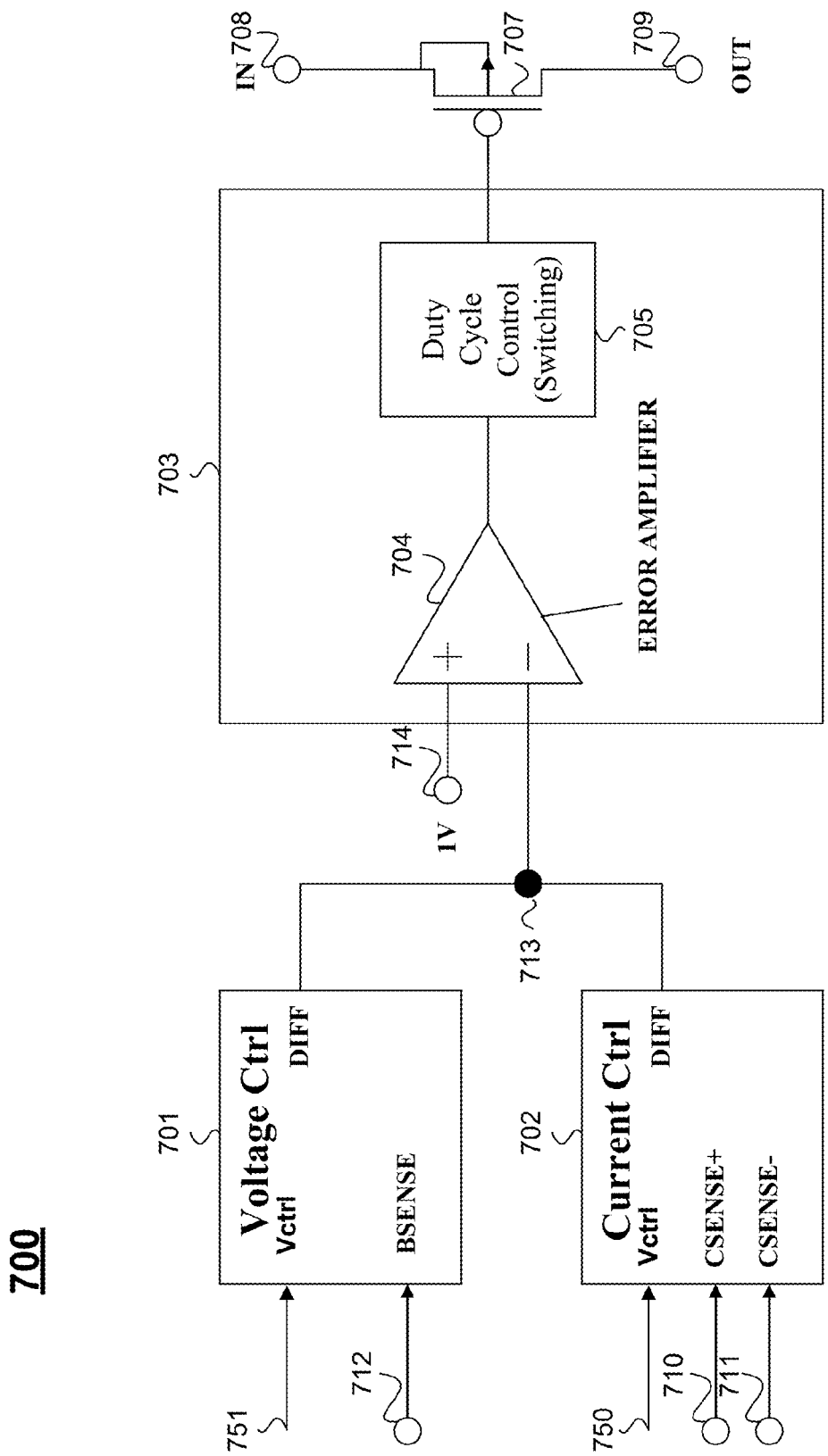
FIG. 7 is an example of a battery charger according to one embodiment of the present invention.

FIG. 7 is an example of a battery charger according to one embodiment of the present invention. Battery charger 700 includes a voltage controller 701, a current controller 702, and a switching regulator 703 coupled to a transistor 707 (e.g., a PMOS transistor) for controlling the voltage and current coupled between an input terminal 708 and an output terminal 709. Current controller 702 includes a first input terminal 710 and a second input terminal 711 for sensing the current through an output current sense resistor (e.g., 0.1 Ohm Resistor). Terminal 710 is coupled to the positive terminal of the resistor, which is coupled to terminal 709 of transistor 707, and terminal 711 is coupled to the negative terminal of the resistor, which is coupled to a battery (in a switching regulator, terminal 709 is coupled to an inductor, and the other terminal of the inductor may be coupled to terminal 710). Current controller 702 further includes a control input 750 for controlling the amount of current generated by the switching regulator in response to the current sensed between terminals 710 and 711. The output of current controller 702 is coupled to the input of regulator 703. Voltage controller 701 includes a battery sense input terminal 712, which is coupled to the battery, and a control input 751, which may be coupled to a DAC, for example. The output of voltage controller 701 is also coupled to the input of switching regulator 703. Switching regulator 703 may include an error amplifier 704 having a first input coupled to a reference voltage 714 (e.g., 1 volt) and a second input terminal coupled to the output of the voltage controller 701 and current controller 702. The output of error amplifier 704 is coupled to the input of a switching circuit 705, such as a duty cycle control input of a pulse width modulation ("PWM") circuit, for example. It is to be understood that a variety of switching techniques could be used to practice the present invention. Node 713 is a negative feedback node of the regulator. Thus, under either current control or voltage control, the loop will drive node 713 to the same voltage as the reference voltage of the error amplifier (e.g., 1 volt).

Figure 8:
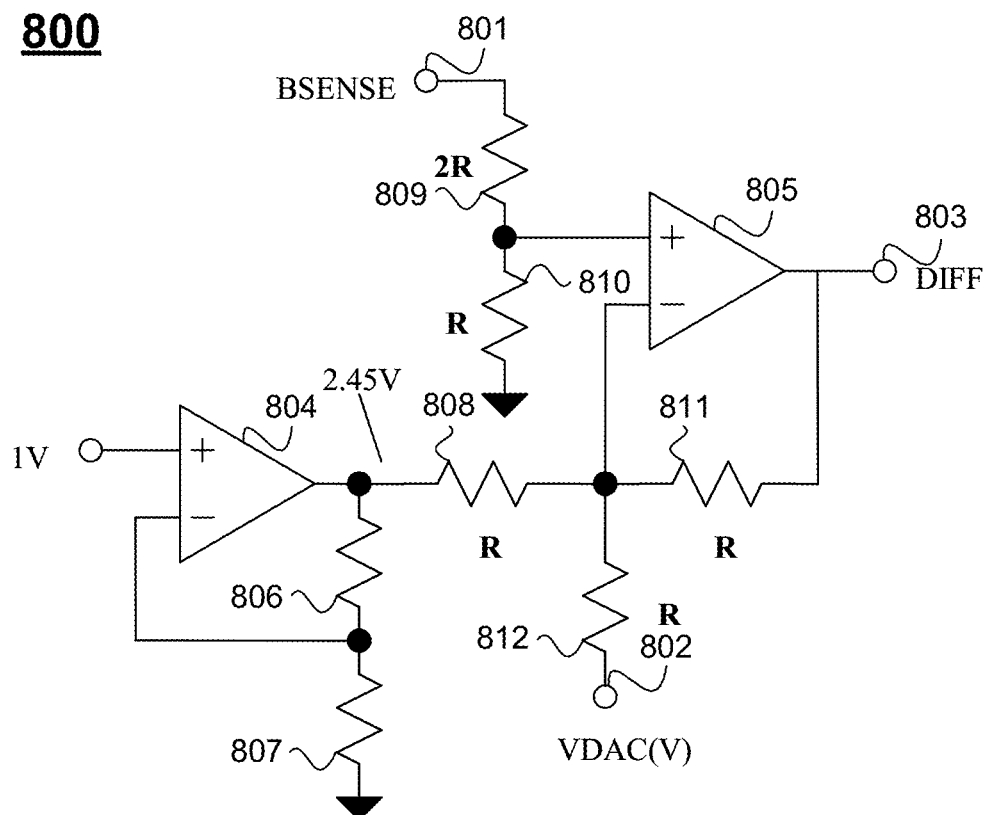
FIG. 8 is an example of a voltage controller according to one embodiment of the present invention.

FIG. 8 is an example of a voltage controller according to one embodiment of the present invention. Voltage controller 800 is just one example of a control circuit that may be used to practice different embodiments of the invention. In this example, a battery sense terminal 801 is coupled to a battery to be charged. A second input terminal 802 is coupled to the output of a digital to analog converter ("VDAC") for setting the voltage at the battery terminal to a programmed voltage value. Terminal 802 may be coupled through the VDAC to a register or memory that stores a charging parameter to set the voltage at the battery. The battery voltage may be adjusted by changing the charging parameter, thereby changing the voltage at terminal 802 across a range of different values. For example, as mentioned above, the output of the voltage controller 800, DIFF, will be driven to the same voltage as the error amplifier reference, which is 1 volt in this example. A differential summing network including amplifiers 804 and 805 and the network of resistors 806-812 establish the following relation between the voltage at the output, DIFF, the battery voltage, BSENSE, and the DAC voltage, VDAC(V):

DIFF=$B$SENSE−(2.45V+VDAC($V$)).

Thus, when DIFF is driven to 1 volt by the feedback loop, the battery voltage is a function of the voltage on the output of the DAC.

$B$SENSE=3.45+VDAC($V$); when DIFF=1 volt.

Accordingly, the battery voltage may be programmed by changing the digital values of bits coupled to the input of the DAC.

Figure 9:
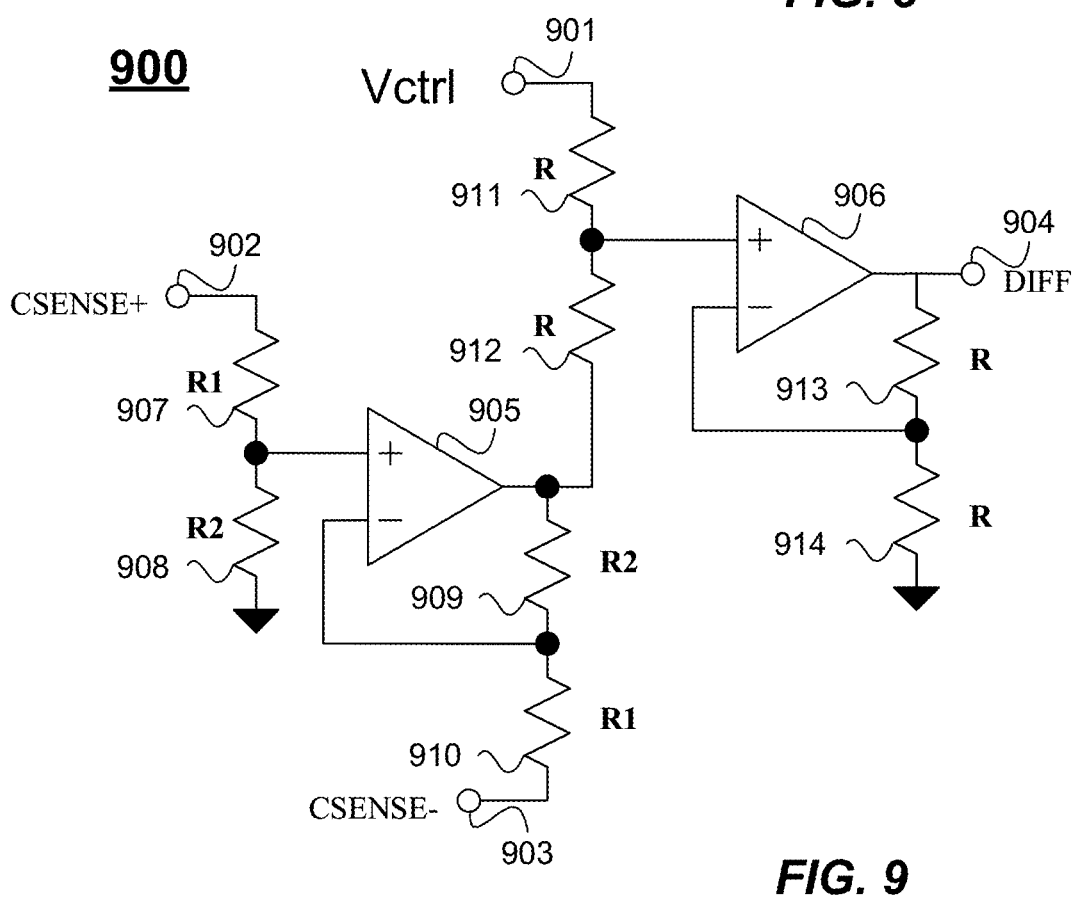
FIG. 9 is an example of a current controller according to one embodiment of the present invention.

FIG. 9 is an example of a current controller according to one embodiment of the present invention. Current controller 900 is just one example of a control circuit that may be used to practice different embodiments of the invention. In this example, positive and negative current sense terminals 902-903 are coupled across a sense resistor at the input of a battery to be charged. Control input terminal 901 is coupled to a control voltage ("Vctrl") for setting the controlled current into the battery in response to a digital or analog controller. For example, Vctrl may receive an analog voltage from an analog circuit that is responsive to either the output voltage or input current for reducing the battery current as the battery voltage increases. Alternatively, terminal 901 may be coupled through a digital-to-analog converter ("DAC") to a register or memory that stores a charging parameter to set the current into the battery. The battery current may be adjusted by a digital controller in response to either the battery voltage or input current by changing a charging parameter, thereby changing the voltage at terminal 901 across a range of different values. As an example, as mentioned above, the output of the current controller 900, DIFF, will be driven to the same voltage as the error amplifier reference, which is 1 volt in this example. A differential summing network including amplifiers 905 and 906 and the network of resistors 907-914 establish the following relation between the voltage at the output, DIFF, the battery current as measured by voltages, CSENSE+ and CSENSE−, and the control voltage:

DIFF=$R2/R1$(CSENSE+−CSENSE−)+$V$ctrl.

Thus, when DIFF is driven to 1 volt by the feedback loop, the battery current is a function of the voltage on Vctrl.

(CSENSE+−CSENSE−)=(1V−$V$ctrl)/5; when DIFF=1 volt and $R2/R1$=5.

Accordingly, the current supplied to the battery by the switching regulator may be changed by changing the control voltage (e.g., by changing the digital values of bits coupled to the input of the DAC). While the above circuits in FIGS. 7-8 use differential summing techniques, it is to be understood that other current and/or voltage summing techniques could be used to sense the output battery current and voltage and generate control signals to drive the control input of a switching regulator.

Referring to FIGS. 7-9, one feature of the present invention may include connecting the outputs of the current controller and the voltage controller to the regulator using a "wired-OR" configuration. For example, in one embodiment, the output pull-down transistor of amplifier 805 in the voltage controller 800 and the output pull-down transistor of amplifier 906 in the current controller 900 are "weak" devices. For example, the devices for sinking current from the DIFF node are much smaller than the devices in amplifiers 805 and 906 for sourcing current into the DIFF node. During current control mode, when the battery voltage is below the value programmed by VDAC(V), the positive input to amplifier 805 (BSENSE) is below the negative input, and the output of amplifier 805 will attempt to sink current from DIFF. However, the output of current controller amplifier 906 will be driving the DIFF node in the positive direction. Thus, because the pull-down output of amplifier 805 is weaker than the pull-up output of amplifier 906, the system will be dominated by constant current controller 900. Similarly, when the voltage on the battery (BSENSE) increases to the point where the positive and negative inputs of amplifier 805 are equal, the voltage controller will dominate. At this point, the current through the sense resistor will begin to decrease, and the output of amplifier 906 will start to pull down. However, because the pull-down output of amplifier 906 is weaker than the pull-up output of amplifier 805, the system will be dominated by constant voltage controller 800.

Figure 10:
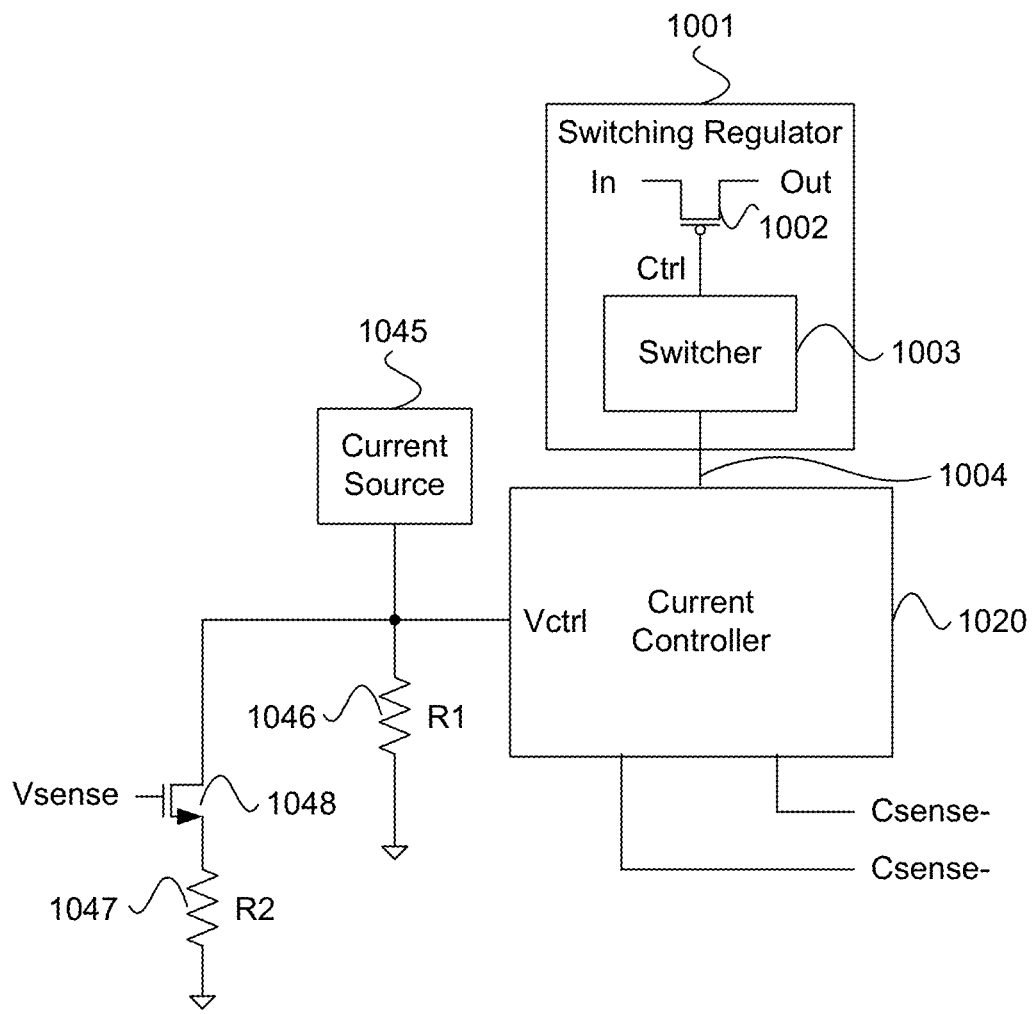
FIG. 10 is an example of an analog controller according to one embodiment of the present invention.

FIG. 10 illustrates an example analog controller according to one embodiment of the present invention. A current controller 1020 includes a first input coupled to "Csense+" and a second input coupled to "Csense−." Here, Csense+ is coupled to the positive terminal of an output current sense resistor, and Csense− is coupled to the negative terminal of the output current sense resistor. Current controller 1020 will generate a control signal to the control input 1004 of switching regulator

1001. Switching regulator 1001 includes a switching circuit 1003, which will, in turn, generate a switching signal (e.g., a pulse width modulated signal) to the gate of switching transistor 1002 (switching regulator 1001 may also include an error amplifier which has been omitted for illustrative purposes). Current controller 1020 further includes a control input, Vctrl. The voltage at Vctrl may be used to control the battery current. In this example, the voltage at the control input to current controller 1020 is set by a current source 1045 into a resistor 1046 ("R1"). When the system is in precharge mode, the current provided by current source 1045 may be less than the current provided when the system is in fast charge mode. When the system initially enters fast charge mode, the current into resistor 1046 may set a maximum voltage at Vctrl corresponding to the maximum desired output current. Maximum output current at the beginning of the fast charge cycle may be set by design choice in a variety of ways, including by selection of resistor 1046. The voltage Vsense is derived from either the switching regulator input current or battery voltage. Initially, when fast charge mode begins, the voltage Vsense biases transistor 1048 on the edge of conduction. As the voltage on the battery increases, or as the input current to the switching regulator increases, Vsense will increase. As Vsense increases, transistor 1048 will turn on and conduct a current (i.e., Vsense/R2), which will steal current away from resistor 1046, thereby causing the voltage at the control input of current controller 1020 to decrease. Accordingly, as Vctrl decreases, current controller 1020 reduces the output current generated by switching regulator 1001. Therefore, as the battery voltage increases, or as the input current increases, Vsense will cause the current controller 1020 to reduce the output battery current.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. An apparatus comprising:
  a switching regulator comprising a first terminal and a second terminal;
  a battery; and
  a filter coupled between the second terminal of the switching regulator and the battery; and
  wherein the switching regulator receives an input current and an input voltage from a power source on the first terminal and provides a filtered output current to the battery through the filter,
  wherein the filtered output current is greater than the input current into the first terminal of the switching regulator when a voltage on the battery is less than the input voltage, and
  wherein the filtered output current is reduced, in a current control mode, as the voltage on the battery increases and the input current is maintained below a constant threshold value.

2. The apparatus of claim 1 wherein the switching regulator is operable in the current control mode when the voltage on the battery is below a threshold, and wherein the switching regulator is operable in a voltage control mode when the voltage on the battery increases above the threshold.

3. The apparatus of claim 1 further comprising an input current sense circuit.

4. The apparatus of claim 3 further comprising an output current sense circuit, wherein the filtered output current is reduced based on the input current and the filtered output current.

5. The apparatus of claim 1 further comprising a current controller having a first input coupled to sense the filtered output current and a second input coupled to sense the voltage on the battery, wherein the filtered output current is reduced based on the voltage on the battery and the filtered output current.

6. The apparatus of claim 1 wherein the current control mode is an output current control mode.

7. The apparatus of claim 1 wherein the filtered output current is reduced continuously.

8. The apparatus of claim 1 wherein the filtered output current is reduced incrementally.

9. The apparatus of claim 1 wherein the filtered output current is reduced after a precharge mode of operation and before transition to a constant voltage charging mode of operation.

10. The apparatus of claim 1 further comprising an error amplifier, wherein at least one input of the error amplifier is coupled to an input current sense circuit.

11. The apparatus of claim 10 wherein the at least one input of the error amplifier is coupled to an output current sense circuit.

12. The apparatus of claim 11 wherein the at least one input of the error amplifier is coupled to the voltage on the battery.

13. The apparatus of claim 1 wherein the output current is reduced so that the total power into the switching regulator does not exceed the total power available from the power source.

14. A method of charging a battery comprising:
  receiving an input current and an input voltage on a first terminal of a switching regulator from a power source;
  providing a filtered output current from a second terminal of the switching regulator to a battery through a filter; and
  reducing the filtered output current, in a current control mode, as a voltage on the battery increases, wherein the input current is maintained below a constant threshold value,
  wherein the filtered output current is greater than the input current when the voltage on the battery is less than the input voltage.

15. The method of claim 14 wherein the switching regulator is operable in the current control mode when the voltage on the battery is below a threshold, and wherein the switching regulator is operable in a voltage control mode when the voltage on the battery increases above the threshold.

16. The method of claim 14 further comprising sensing the input current.

17. The method of claim 16 further comprising sensing the filtered output current, wherein the filtered output current is reduced based on the input current and the filtered output current.

18. The method of claim 14 further comprising sensing the voltage on the battery and the filtered output current, wherein the filtered output current is reduced based on the voltage on the battery and the filtered output current.

19. The method of claim 14 wherein the current control mode is an output current control mode.

20. The method of claim 14 wherein the filtered output current is reduced continuously.

21. The method of claim 14 wherein the filtered output current is reduced incrementally.

22. The method of claim 14 wherein the filtered output current is reduced after a precharge mode of operation and before transition to a constant voltage charging mode of operation.

23. The method of claim 14 further comprising coupling a first signal corresponding to a sensed input current to at least one input of an error amplifier.

24. The method of claim 23 further comprising coupling a second signal corresponding to a sensed output current to at least one input of the error amplifier.

25. The method of claim 24 further comprising coupling a third signal corresponding to a sensed battery voltage to at least one input of the error amplifier.

26. The method of claim 14 wherein the output current is reduced so that the total power into the switching regulator does not exceed the total power available from the power source.

* * * * *